United States Patent
Easley et al.

(10) Patent No.: US 7,649,455 B2
(45) Date of Patent: *Jan. 19, 2010

(54) SYSTEM AND METHOD FOR PROVIDING CONTAINER SECURITY

(75) Inventors: Linda G. Easley, McLean, VA (US); Ronald L. Martin, Chesapeake Beach, MD (US)

(73) Assignee: System Planning Corporation, Arlington, VA (US)

( * ) Notice: Subject to any disclaimer, the term of this patent is extended or adjusted under 35 U.S.C. 154(b) by 209 days.

This patent is subject to a terminal disclaimer.

(21) Appl. No.: 11/488,049

(22) Filed: Jul. 18, 2006

(65) Prior Publication Data

US 2006/0255934 A1 Nov. 16, 2006

Related U.S. Application Data

(63) Continuation of application No. 10/934,676, filed on Sep. 3, 2004, now Pat. No. 7,098,784.

(60) Provisional application No. 60/499,338, filed on Sep. 3, 2003.

(51) Int. Cl.
*G08B 1/08* (2006.01)
*G08B 13/08* (2006.01)
*H01Q 1/32* (2006.01)

(52) U.S. Cl. .............................. 340/539.13; 340/545.6; 340/585; 340/539.1; 340/572.7; 343/711

(58) Field of Classification Search ............ 340/539.13, 340/545.6, 585

See application file for complete search history.

(56) References Cited

U.S. PATENT DOCUMENTS

| | | | | |
|---|---|---|---|---|
| 5,936,523 A * | 8/1999 | West | ........................ | 340/545.6 |
| 6,687,609 B2 * | 2/2004 | Hsiao et al. | .................. | 701/207 |
| 7,002,472 B2 * | 2/2006 | Stratmoen et al. | ...... | 340/539.26 |
| 7,019,640 B2 * | 3/2006 | Canich et al. | ................ | 340/531 |
| 2004/0233054 A1 * | 11/2004 | Neff et al. | ................. | 340/539.1 |

* cited by examiner

*Primary Examiner*—Donnie L Crosland

(57) ABSTRACT

A system for monitoring the contents of a closed container is provided. The system includes a sensing system for monitoring the contents of the container; a signal receiving element for receiving sensor data from the sensing system; a control element for analyzing received sensor data; a first transceiver element for receiving signals containing sensor data from within the container and for transmitting those signals outside of the container; and a satellite transceiver element for receiving signals from the first transceiver element and for forwarding the received signals via satellite uplink to a remote location.

12 Claims, 12 Drawing Sheets

SYSTEM AND METHOD FOR PROVIDING CONTAINER SECURITY

CLAIM OF PRIORITY

The present invention is a continuation of application Ser. No. 10/934, 676, filed Sep. 3, 2004, now U.S. Pat. No. 7,098, 784, and claims priority to U.S. Provisional Patent Application No. 60/499,338, filed Sep. 3, 2003.

BACKGROUND OF THE INVENTION

1. Field of the Invention

The present invention relates generally to container security and, more particularly, to a shipping container security system to provide a high degree of confidence regarding the content and security of the container.

2. Background of the Invention

In today's security conscious transportation environment, there is a strong need to cost-effectively and accurately monitor the contents of containerized shipments. This need exist both in the United States and abroad.

Despite the strong need, no present solution has been able to provide the protection and accuracy needed to suit the transportation industry and the government agencies charged with monitoring shipments. This lack of an acceptable solution is due to many factors which complicate interstate and international shipping. Shipping containers are used to transport most of the commerce entering, leaving, and transiting or moving within the United States. It is estimated that there are over 6 million containers moving in global commerce. Shipping containers have revolutionized the transportation of goods by greatly reducing the number of times goods must be loaded and unloaded during transport. However, at the same time, this same advantage has created a major problem in that it is very difficult to monitor and track the contents of each container during transport.

Beyond their basic construction, monitoring the content of shipping containers is also difficult because these containers are carried through numerous transit points and depots all over the world and it is impractical to stop and check the contents of each container individually at each point of transit. Dealing with this problem, the U.S. Customs Service estimates it can inspect just 5% of the 6 million containers entering and reentering the U.S. each year. Accordingly, agencies such as the United States Customs Service are seeking improved ways to achieve cargo container security and integrity upon arrival at the ports of entry of the United States.

To date, many government agencies have initiated programs to improve container security. These include many useful elements that are intended to preclude their use by terrorists. However, at present, none of the container tracking systems in use provide a way to assure the integrity of the contents of the containers to assure global container security. Current computer tracking systems are effective at monitoring the location of individual containers from point of origin to destination and maintaining an inventory of loaded and empty containers. Most of these systems rely on transponders mounted on the containers that send messages to satellites or ground stations, from which the messages are rerouted to shipping companies, freight forwarders, and companies. However, these tracking systems are unable to guarantee that a given container does not contain contraband.

As an alternative, some present systems rely on external sensors which can inspect container contents for radiation and other items. The Vehicle and Cargo Inspection System (VACIS) sensors developed by SAIC International (and other similar systems) have proven useful in detecting unauthorized items, such as automobiles, in containers. Widespread use of VACIS will help monitor routine traffic and assist customs agents in controlling smuggling. Systems like VACIS, however, cannot prevent determined terrorists from moving dangerous items into the United States in a container because the technique is not fool-proof, it is costly (Over $300 per container movement inspected), slows the velocity of containers moving in the supply chain (because of delays in U.S. government invoicing costs and clearing these costs before release of goods to the consignee) and is not applied to 100% of containers destined to move into the United States. The most likely solution is to tag, track and tamper-proof every container as it is transported. This typically means that the only way to have a high degree of security is to stop and open containers, unload their contents, scan the contents with appropriate sensors or inspect the contents. However, inspecting 100%, every container that enters the United States, would be a time-consuming, laborious process. Such an undertaking would be expensive, require a large work force of inspectors, slow the flow of commerce, and force prices of imported goods to increase significantly. The result would be drastic increases in the costs of goods delivered to the U.S. consumer.

3. Description of the Related Art

Beyond the VACIS system described above, several solutions for container surveillance during transport have been proposed. For instance, U.S. Pat. No. 5,712,789 describes a container monitoring system and method for identification, tracking and monitoring of containers from a point of departure to a final destination and return. This system is able to provide shippers and their customers an updated status for each container using various telecommunications systems.

Similarly, U.S. Pat. No. 5,565,858, provides a device external to the shipping container which communicates using a combination of a short range transceiver and a long range transceiver.

European Patent Application No. EP 1246094 also describes a communication system external to the container which allows for tracking the movement of the container. This application also describes the use of a satellite positioning unit.

Finally, U.S. Pat. No. 5,831,519 describes a method for surveillance of the atmosphere within a shipping container and related equipment via a centralized backup system located on a transportation unit. In particular, this reference discloses a communication system by which information regarding the status of the container is relayed to a transporting carrier (i.e. a truck) which then is able to transmit data regarding the container location and container contents via a satellite or wireless uplink.

A problem with the existing technology as outlined above is that no solution is provided which enables the shipping container to be self-evaluating and self-reporting as to its status and that of its cargo. Further, problems exist with respect to integration of container security with the increasing important area of RFID inventory tracking.

SUMMARY OF THE INVENTION

To address the problems and limitations noted above, a system for monitoring the contents of a closed container is provided. According to a first preferred embodiment, the system includes a sensing system for monitoring the contents of the container; a signal receiving element for receiving sensor data from the sensing system; a control element for analyzing received sensor data; a first transceiver element for receiving signals containing sensor data from within the container and for transmitting those signals outside of the container; and a satellite transceiver element for receiving signals from the first transceiver element and for forwarding the received signals via satellite uplink to a remote location.

The accompanying drawings, which are incorporated in and constitute a part of this specification, illustrate various embodiments of the invention and, together with the description, serve to explain the principles of the invention.

DESCRIPTION OF THE PREFERRED EMBODIMENTS

The present invention provides a unique system for monitoring and reporting environmental information regarding the interior of the shipping container. Further, the present invention provides a unique system for reading and incorporating RFID information in this system.

Throughout this specification, preferred embodiments of the invention are described in detail below with reference to the accompanying drawings. In the embodiments, various examples and illustrative embodiments are provided. It should be understood that these embodiments and examples are provided purely for purposes of illustration. The present invention is limited solely by the claims appended hereto.

Figure 1:
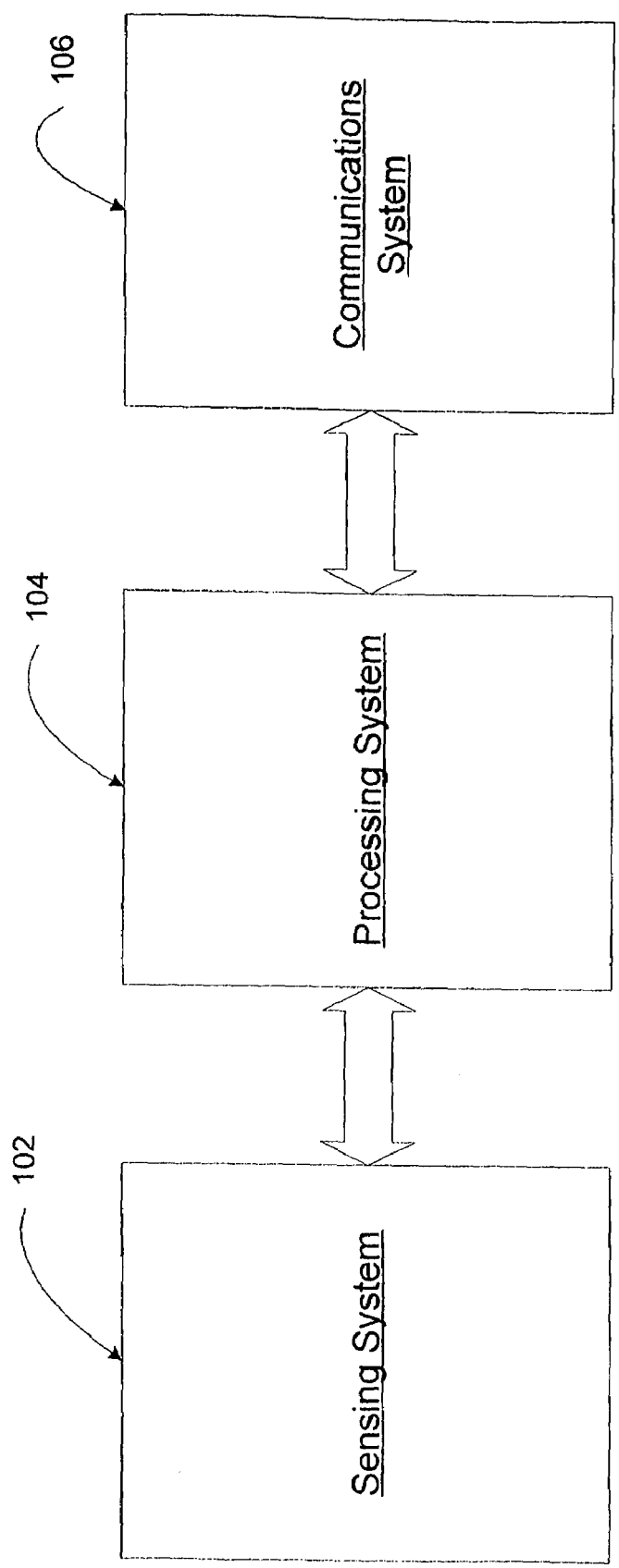
FIG. 1 shows a functional configuration of an system according to an embodiment of the invention.

With reference now to FIG. 1, and for the purposes of explanation, the basic system of the present invention may consist of three major systems: a sensing system 102 for monitoring conditions within the container; a processing system 104 for analyzing and processing data from the sensing system; and a communications system 106 for forwarding data to monitoring devices outside of the container.

I. Sensing System

Figure 2:
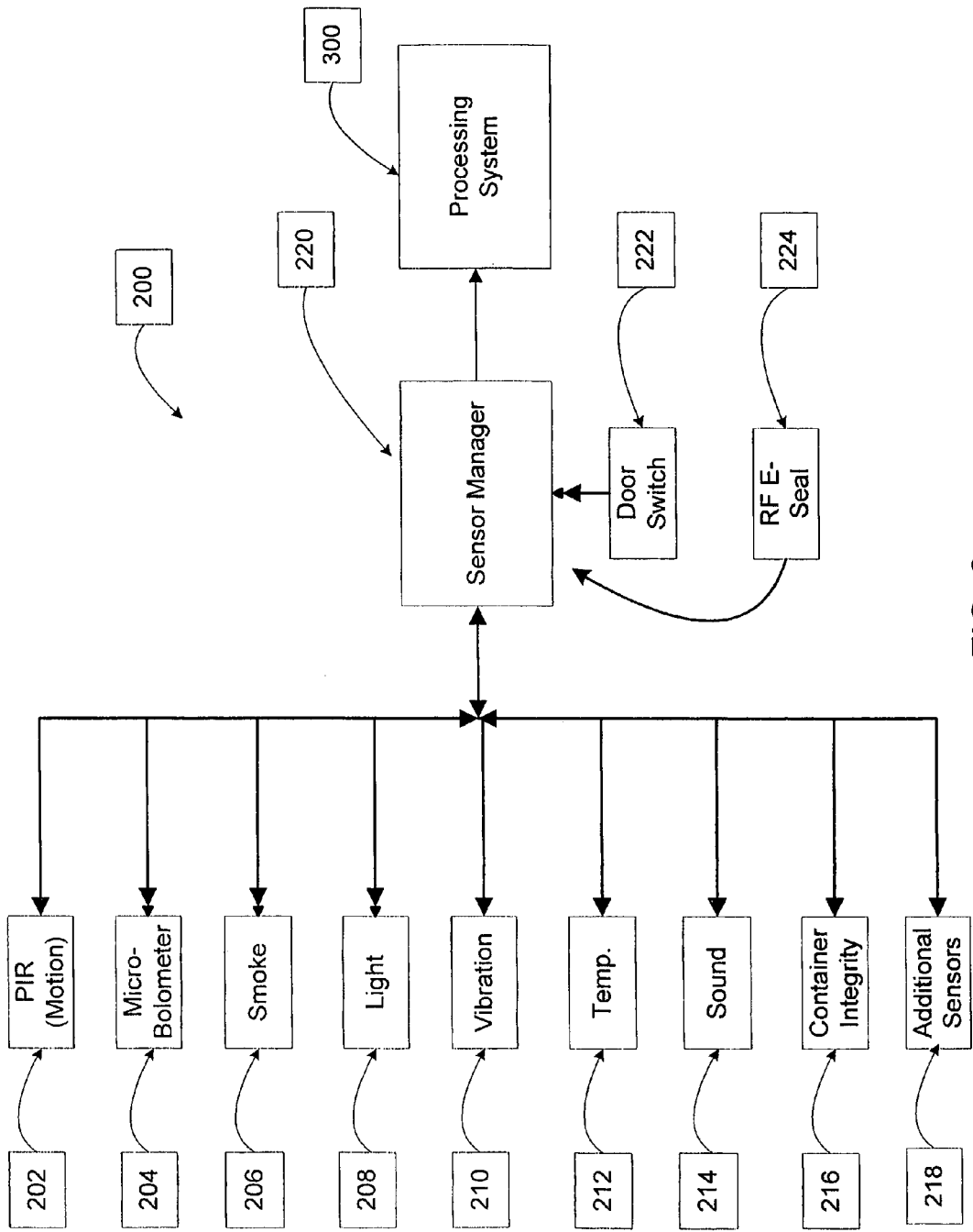
FIG. 2 shows a functional configuration of an sensing system according to an embodiment of the invention.

With reference now to FIG. 2, the details of the sensing system 200 will now be discussed. As shown in FIG. 2, the sensing system of the present invention consists of a set of sensors chosen to give the most accurate and complete view of the container environment. In accordance with the preferred embodiment of the present invention, these sensors preferably include: a PIR (motion) sensor 202; a micro-bolometer 204 for detecting the presence of people and animals; a smoke detector 206; a light sensor 208; a vibration sensor 210; a temperature sensor 212; an auditory (sound) sensor 214; and a container integrity sensor 216 (as discussed in detail further below). This sensor suite has been selected particularly as an anti-penetration and human tampering detection system. In addition, further sensors that are RF enabled and fully functional within the LAN of the invention and customized to match current threats such as ionization detectors to detect explosives or radiological sensors to detect gamma or neutron emissions may be incorporated for use with the preferred sensor suite provided herein.

In addition to the environment sensors, in accordance with the preferred embodiment of the present invention, a door switch sensor 222 (such as an optical, ultrasonic, magnetic or mechanical switch) may preferably also be included to detect the status of the door. Together, the sensors of the present invention provide anti-tampering protection, aid in the detection of contraband, and continuous monitoring of environmental conditions that could affect the cargo within the container or indicate suspicious activity.

Preferably, each sensor of the present invention includes circuitry to continuously monitor the sensor and capture the highest amplitude signal over a pre-determined, short time interval. Thereafter, as signals are detected, it is preferred that a sensor manager 220 is provided to sample the held measured value or cumulative values once per programmed interval and thereafter, provide the sampled results for further processing and analysis by processing system 300 of the present invention. The interval can be changed by the processing system as required to gather more detailed information about possible change of container integrity status or the presence of unauthorized content.

Preferably, the sensor manager 220 of the present invention may also provide analog and digital ports for additional inputs. For example, a container door switch may be connected to one of these ports. This door switch may provide additional protection to sense when the container doors are open, beyond that provided by the electro/mechanical door switch 222 detailed herein. Additionally, an RF e-seal device and RFID reader device may also be incorporated as detailed below.

A. Sensors

The following sensors comprise a preferred suite of sensors for use with the sensing system of the present invention. Preferably, each of these should be designed to work independently to monitor the container environment. Data from these sensors is processed, stored, and acted upon by the processing system of the present invention as discussed in detail below. It should be understood that the exact placement and type of sensors may vary according to a variety of factors including the specific needs of the shipper and the type of goods being shipped.

Further, it should be understood that, although preferred operating parameters for each preferred sensor described below are suggested, each sensor may, of course, be adjusted to suit particular applications. The key goal for each sensor is to allow a resolution of measurement sufficient to allow for noting small and sudden differences in an otherwise stable container environment that may indicate a change in the container integrity status or the presence of unauthorized content.

Temperature—Preferably, the temperature sensor 212 of the present invention will allow measurement of temperatures in the range is −40° C. to 125° C. with a ±2% accuracy and a 0.25° C. resolution.

Visible Light—Preferably, the light sensor 208 of the present invention should allow for light levels between 0 and 2000 Lux.

Acoustic—Preferably, an acoustic sensor 214 for use with the present invention will provides information on sounds in the environment including high frequency sounds unique to cutting or cracking.

Vibration—The vibration sensor 210 of the present invention preferably consists of a two-axis accelerometer.

IR Motion—Preferably, the motion detector 202 of present invention will be sensitive to electromagnetic energy in the 8-10 micron wavelength band where humans produce their peak IR energy so that it is optimized to sense human motion.

IR Microbolometer—Microbolometers are passive sensors that absorb infrared radiation and convert the change in the temperature of the micro-detector into a change in resistance or other parameter, which is then sensed electronically. Preferably, the IR Microbolometer 204 of the present invention will monitor possible activity in the IR part of the spectrum.

Smoke Detector—Preferably, the smoke detector 206 of the present invention will be a photoelectric smoke detector to sense chemical or particulate changes in the atmosphere of a shipping container. It should allow for detection of smoldering cargo combustion (smoking embers or open fire) and attempts to cut through the walls of the container with a torch.

Door Switch—According to a preferred embodiment of the present invention, the system of the present invention may also include a magnetic proximity sensor 222 for monitoring the opening and closing of the door. This sensing function alternatively can be accomplished with an optical photometer or ultrasonic transducer that senses an angular change in a reflected diode light imposed on the interior of the door.

RF E-Seal—As an alterative or in addition to a basic door switch sensor, the present invention may also use an RF E-seal device 224, which may be attached to the door hasp or hidden within the door frame of the container. This RF E-seal device 224 preferably is enabled to periodically send information regarding the status of the RF E-seal 224 via a wireless link (usually 2.45 GHz signal). Preferably, the sensor manager 220 inside the container periodically receives the status of the seal through an RF conformal antenna inserted through the door gasket during container stuffing operations. Opening the door breaks the seal, causing the RFID transmitter to cease active transmission. Preferably, the sensor manager 220 will record the date and time of such an event in a suspicious activity file in its memory log.

Container Integrity Sensors (Hole Detection)—In accordance with the present invention, sensors for detecting breaches in the container integrity (holes) may also be included to enhance container security. Preferably, these type of sensors may include one of the following sensing techniques. Alternatively, other types of sensing techniques may be applicable as well.

(i) Passive Ultrasonic Technique: Cracking or tearing of the container's structural shell during and after the creation of the hole creates a series of ultrasonic shock waves with a wide spectrum of energy distribution. Even in very high acoustic noise environments, relatively quiet background noise portions of the spectrum above 20 KHz may be exploited to detect the presence of the suspicious acoustic emission and in certain applications, triangulate its source. In accordance with the present invention, this technique will include a sensor including a high-pass-band filter for processing signal wave-forms detected by piezoelectric accelerometers.

(ii) Measurement of Reflected RF Energy: The second solution treats the inside of the container as a microwave (Faraday) reflective cavity, by retrofitting a thin sheet of metal or metallic foil on top of the wooden deck inside the container or on the bottom of the floor (under the container). This technique of hole detection uses pulsed RF microwave energy from an RFID reader operating periodically in the container while it is closed. If the reader operates at a sweeping frequency centered at approximately 915 MHz, its wavelength would be approximately 30 cm. Holes smaller than 3 cm. in diameter would not markedly affect the energy that is reflected within the cavity. However, holes 7-8 cm (approx 3") in diameter could have the affect of breaching the Faraday cavity effectively forming quarter wave parasitic slot antennas that can drain a detectable amount of microwave energy out of the cavity. This increased energy drain creates a differential property that can be used to detect the sudden presence of the hole. Cargo loaded inside the container will change the standing wave patterns within the cavity and will absorb energy. Such a "loaded Faraday cavity" can have unique characteristics, but the back-scatter energy level should be reduced with the emergence of a hole in the loaded cavity shell regardless, especially for holes 7-8 cm in diameter or larger.

(iii) Measurement of Container Conductivity: The third solution includes sending an electrical current into a network of small conductors layered but insulated from the metal container surface like a dielectric capacitor and measuring the return of current and other electrical characteristics of certain circuits in the grid or measuring the steady state dielectric characteristics. Where holes are formed, the measured return of current measured will be measurably changed and the dielectric constant will be suddenly altered through the creation of ground current paths.

Additional Sensors—In accordance with the preferred embodiment of the present invention, each group of sensors will have a modular open architecture design that will allow for future addition of sensors 218 for such purposes as chemical and radiation detection as required.

II. Processing System

Figure 3:
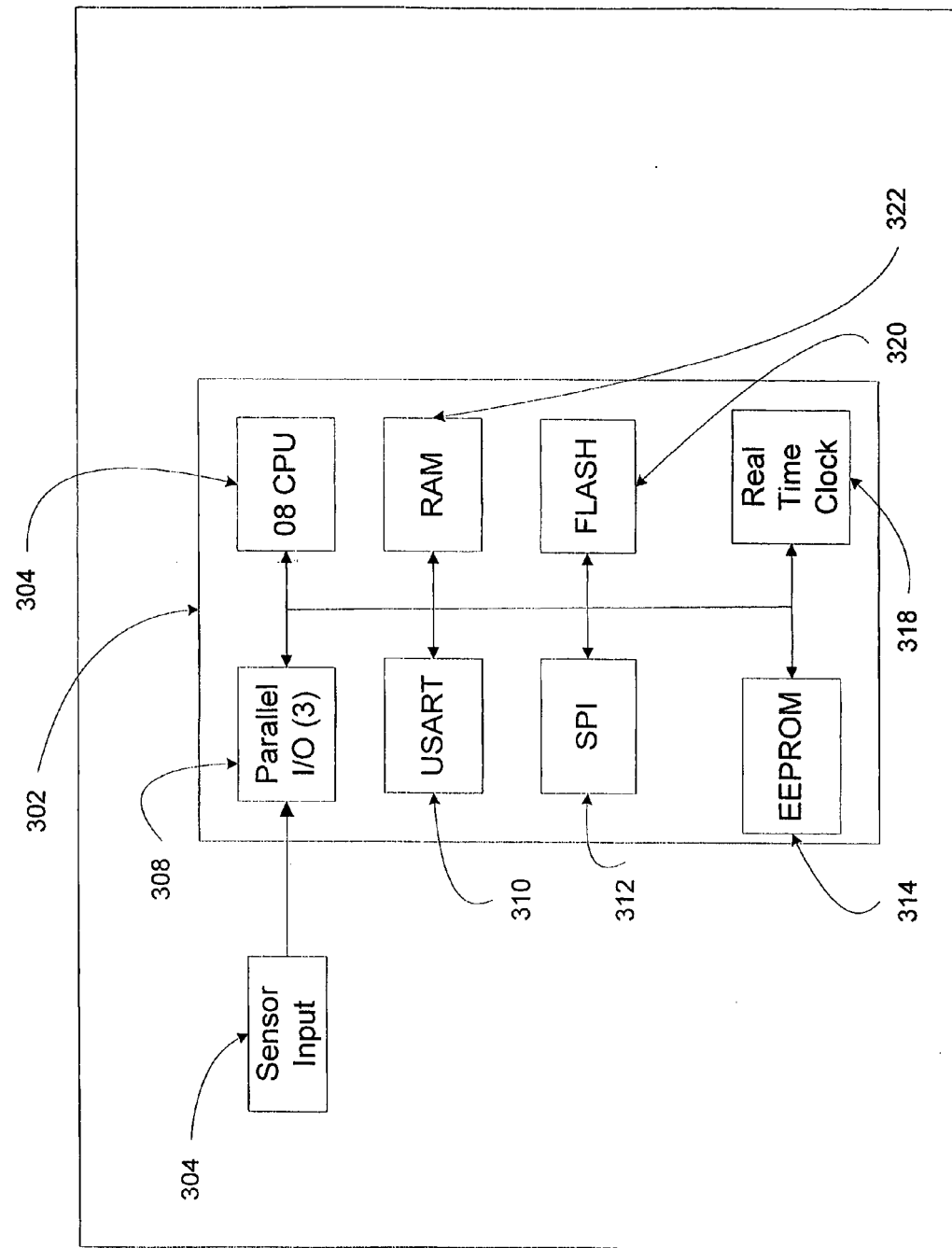
FIG. 3 shows a diagram of a sensing control element according to an embodiment of the invention.
Figure 4:
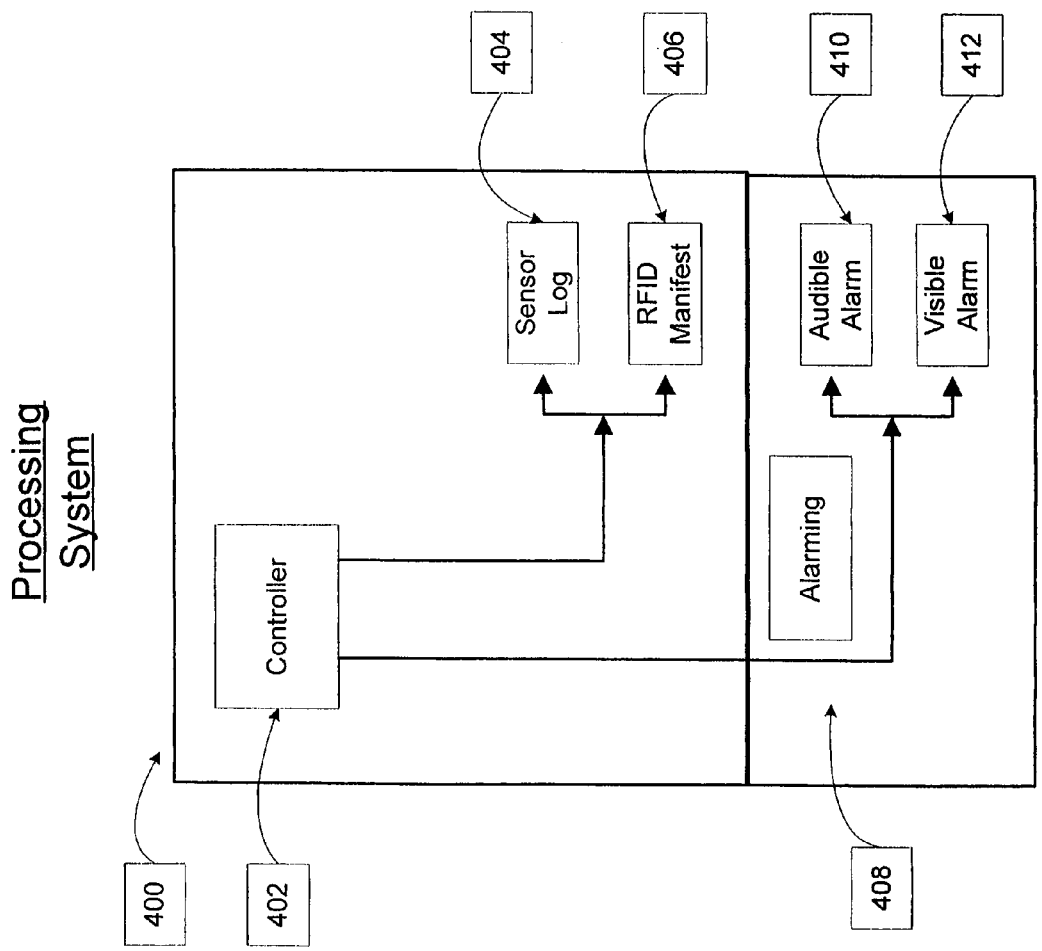
FIG. 4 shows a functional configuration of an processing system according to an embodiment of the invention.

With reference now to FIGS. 3 and 4, a first preferred embodiment of the processing system 300 of the present invention will now be discussed. As shown in FIG. 3, it is preferable that control of the sensor system is maintained by an on-board controller 302. As discussed above, it is preferable that the processing system 300, through its onboard controller 302 compare the sequence and threshold performance of the sensors 304 in the clusters to a set of predetermined patterns and levels derived from empirical trials on an instrumented static test container. Based on a series of rule sets stored in memory, the controller 302 then operates to declare security events and initiate recording and communication actions as programmed. For instance, where sensor input 304 regarding the measured level of smoke or light in the container exceeds a predetermined level, the controller 302 may then function to initiate a message or alarm in response.

In operation, the controller is preferably programmed to routinely scan the conditions of the sensors to ensure operability. It is further preferable, that the controller 302 have access to all other subsystem managers and provide control of the sensor, communications, power, and alerting functions. To achieve this function, as shown in FIG. 4, it is preferred that the controller 402 has access to and handles all of the system logging of sensor data on a sensor log 404 or similar medium. Further, it is preferred that the controller also process and store RFID data (i.e. as an RFID manifest 406 of the container contents) when the system is used in conjunction with an RFID reader (as discussed in detailed below).

With reference now to FIG. 3, it is preferred that the controller 302 incorporates a microprocessor 304, a real time clock 318, a general purpose Input/Output port 308 to support external peripheral control, a Universal Synchronous/Asynchronous Receiver Transmitter (USART) 310, a Serial Port Interface (SPI) 312, and memory such as RAM 322, FLASH memory 320, and EEPROM 314 as shown.

Preferably, the microprocessor 304 used is a low power, high performance, eight-bit integrated circuit based on the Motorola HCS08 instruction set. Such a chip, for instance the NCL08 micro-controller, will preferably use an event driven power management technique to reduce power consumption by half compared with alternative microprocessors. The controller will preferably manages power and hosts the master date-time clock, communication scheduling and annotation of flash memory records.

As shown in FIG. 4, it is further preferred that the controller 402 will also control any alarms 408 which may be placed on a container. In accordance with the present invention, such alarms may include both audible alarms 310 and visible alarms 312.

Alarming

The declaration of an alarm event is a result of sensor data fusion, sensor performance sequencing, and contextual supporting data. When the controller declares an alarm event, it may activate a visible (strobe diode) and an audible alarm. Each alarm is preferably date and time stamped into flash memory along with relevant details of the alarm. The alarm messages will expose the data and rationale for the event declaration to allow for troubleshooting and visual inspection by the carrier before the shipper or Customs agents are obligated to respond. This data also can be forwarded to a central location for scrutiny prior to dispatching an inspector to decrease the possibility of a false alarm response.

III. Communication System

A Communications (Comms) Manager module provides an interface to either a wireless ZigBee (IEEE 802.15.4) subsystem or a wireless Bluetooth subsystem, enabling communications to systems outside the shipping container. The Zig-Bee signal is passed through a sealed container by way of a specially developed passive pass-through antenna (514), allowing wireless communication with the interior systems of the sealed container. The external systems include the RF E-Seal, the Local Interface and the Remote Interface. The RF E-Seal allows for a formal door sealing after loading of the container and it reports its status to the processing system. Violation of this seal could trigger an alarm event. The Local Port Interface provides for a local authorized user to poll the status of the container and to enter data as needed. A laptop or PDA computer may be used for this purpose. Additionally, this functionally may be completed remotely via the Remote Port Interface. The purpose of the Remote Port is to pass status and alarms to a centralized location with an appropriate data/message response from the controller. In accordance with a preferred embodiment of the present invention, the reporting may be made via a wireless connection to a satellite modem to communicate with a satellite system such as Globalstar™ or Orbcomm™.

1. Communications And Interfaces

Figure 5:
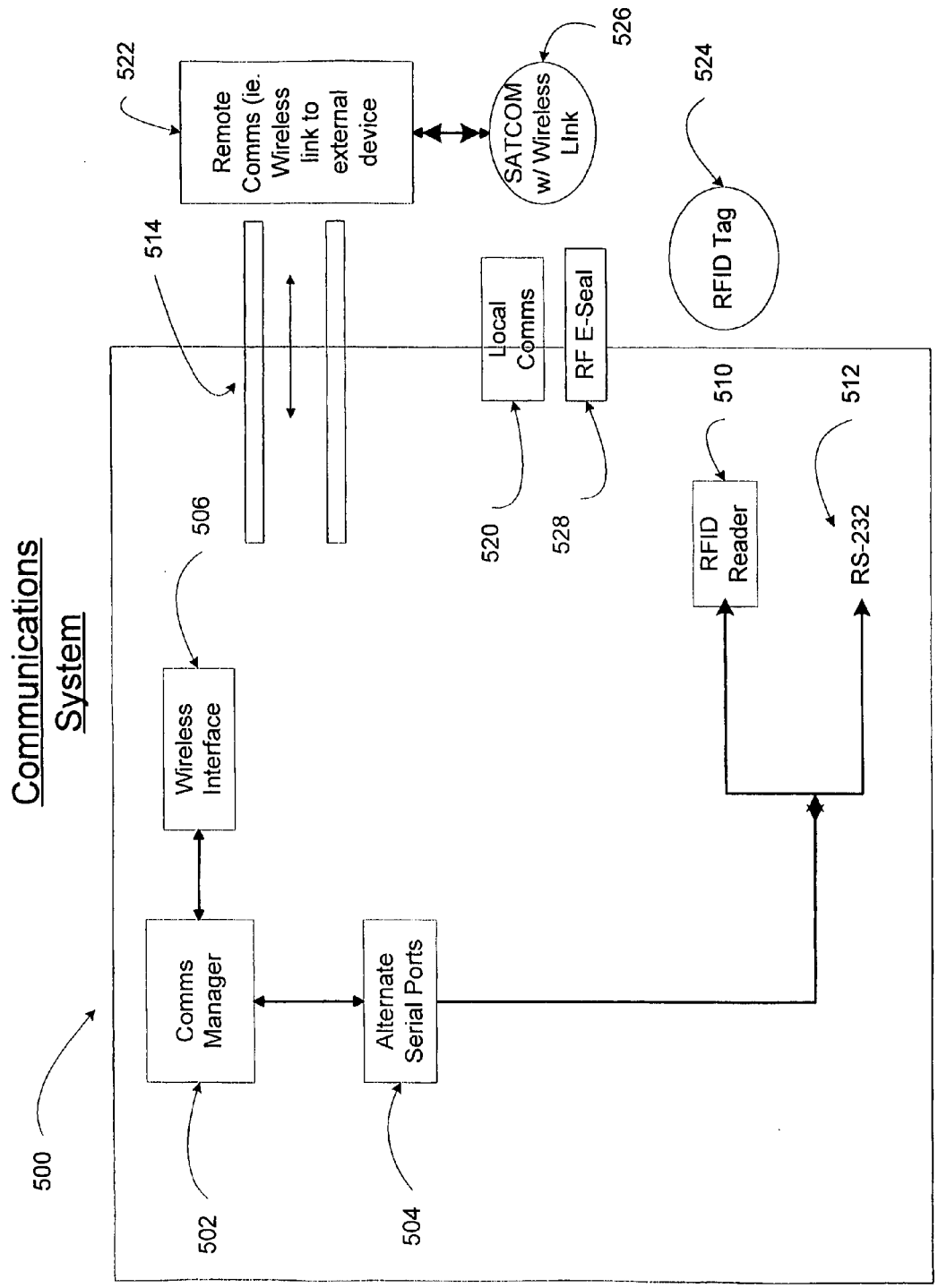
FIG. 5 shows a functional configuration of an communications system according to an embodiment of the invention.

With reference now to FIG. 5, the communications system 500 of the present invention will now be discussed. As shown in FIG. 5, a Communications (Comms) Manager module 502 is provided as an interface to a wireless link 506 enabling communications to systems outside the shipping container. Preferably, the wireless signal is passed through a sealed container by way of a specially developed passive pass-through antenna 514 (discussed in detail below., which allows for wireless communication with the interior systems of the sealed container.

As further shown in FIG. 5, the external systems may include an RF E-Seal 528 (which may be combined with the pass-though antenna 514 or a communications path through the wooden floor of the container), the Local Comms Interface 520 and a Remote Comms Interface 522. The RF E-Seal 528 allows for a formal door sealing after loading of the container. It reports its status to the processing system. Violation of this seal could trigger an alarm event. The Local Comms Interface 520 provides for a local authorized user to poll the status of the container and to enter data as needed. A laptop or PDA computer may be used for this purpose. Additionally, this functionally may be completed remotely via the Remote Comms Interface 522. The purpose of the Remote Comms Interface 522 is to pass status and alarms to a centralized location with an appropriate data/message response from the controller.

In accordance with a preferred embodiment of the present invention, the reporting may be made via a wireless connection to a satellite modem to communicate with a satellite system 526 such as Globalstar™ or Orbcomm™. Preferably, such a satellite device will be a device such as the Axxon™ AxTracker™ or the like, or a customized OrbComm™ VHF satellite GPS tracking communications device which is adapted with ZigBee interface antenna devices to incorporate them into the overall LAN architecture of the security system; these devices include a satellite transceiver, GPS receiver, a customized ZigBee™ wireless antenna with a serial (Ax Tracker™) or duplex (OrbComm™) interface.

According to a preferred embodiment of the present invention, it is preferred that the wireless communications used within the present invention will be based on the ZigBee™ (IEEE 802.15.4) standard. This standard transmits RF signals in the 2.4 GHz ISM band and operates with low power consumption due to its relatively slower data transmission rate (128 Kbps-250 Kbps). This approach enables additional capacity and flexibility of design through an up to 255 node pico-network. Communications are simplex or duplex in design, meaning that data can be assessed in either a push or pull process. The remote communications functions (communications outside the container) will allow for remote polling of alert event history from the flash memory storage as well as verification of "operations normal" and battery charge level.

Additional communications with the communications manager 504 are preferably enabled via industry standard wired interfaces, with communications protocols implemented in firmware for future upgrade. These interfaces preferably will include at least two RS-232 compatible serial ports 504. These alternate serial ports may assist to interface the communications manager 502 to interface with additional remote sensors as well as other local readers/controllers such as an RFID reader or other devices 512.

2. Pass-Through Antenna

Figure 9:
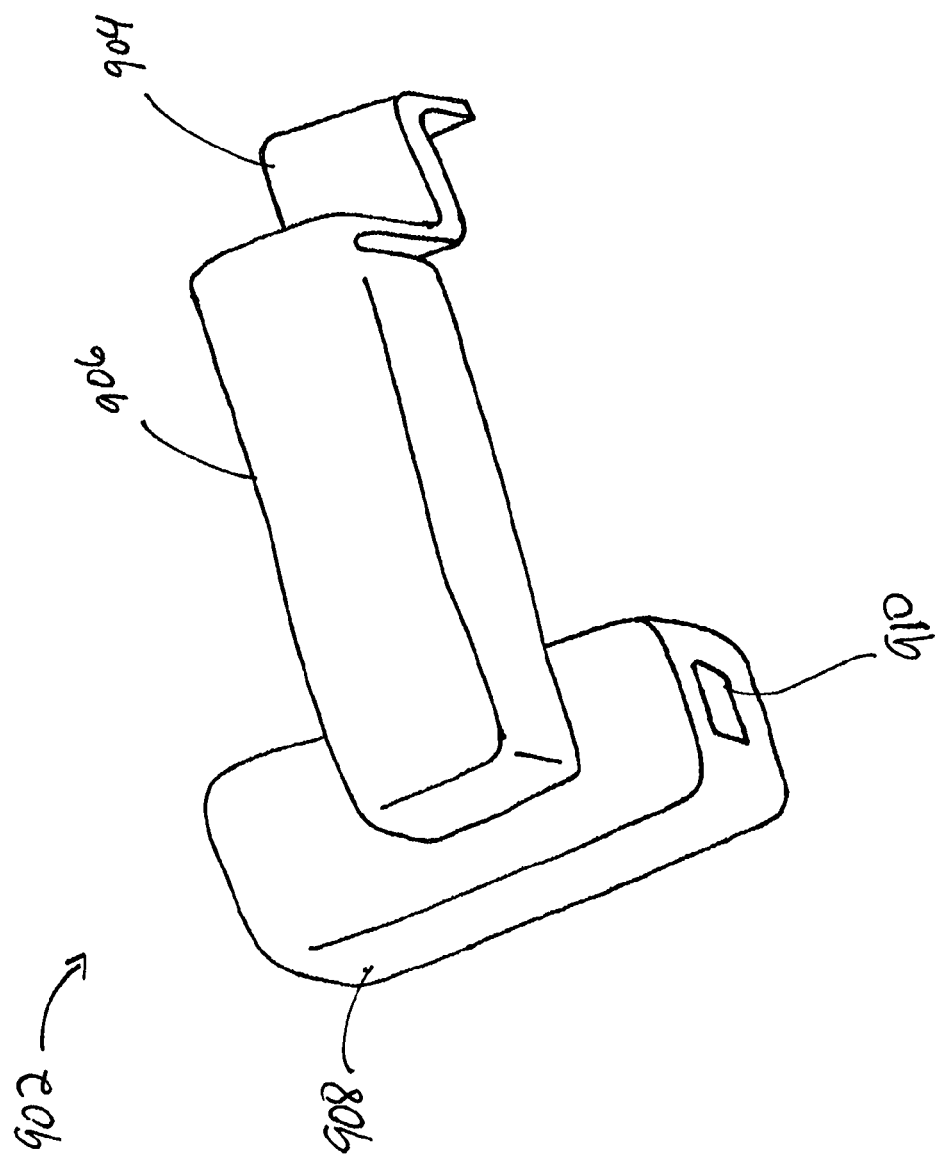
FIG. 9 shows an example of the pass-through antenna according to an embodiment of the invention.
Figure 10:
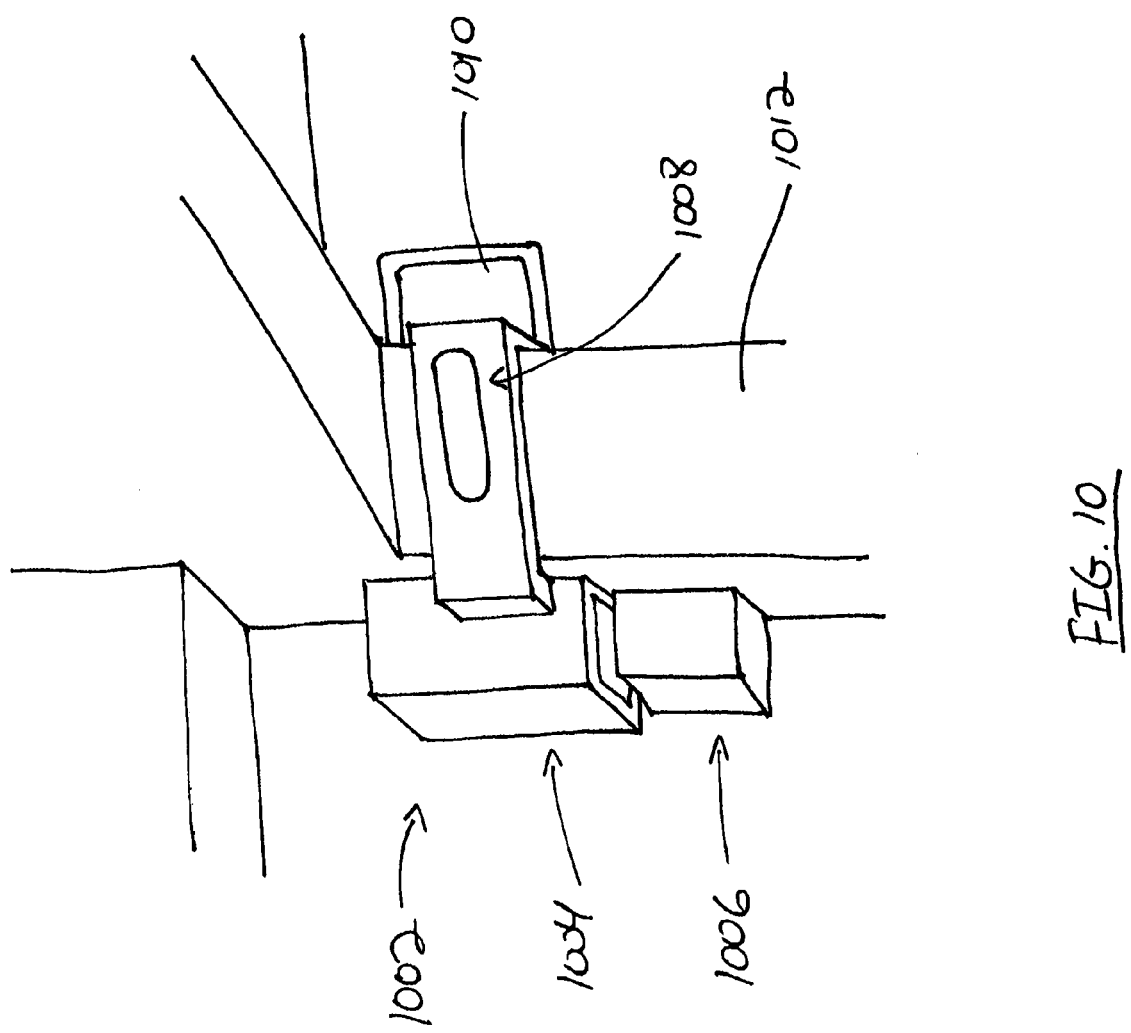
FIG. 10 shows an example of the pass-through antenna deployed according to an embodiment of the invention.
Figure 11:
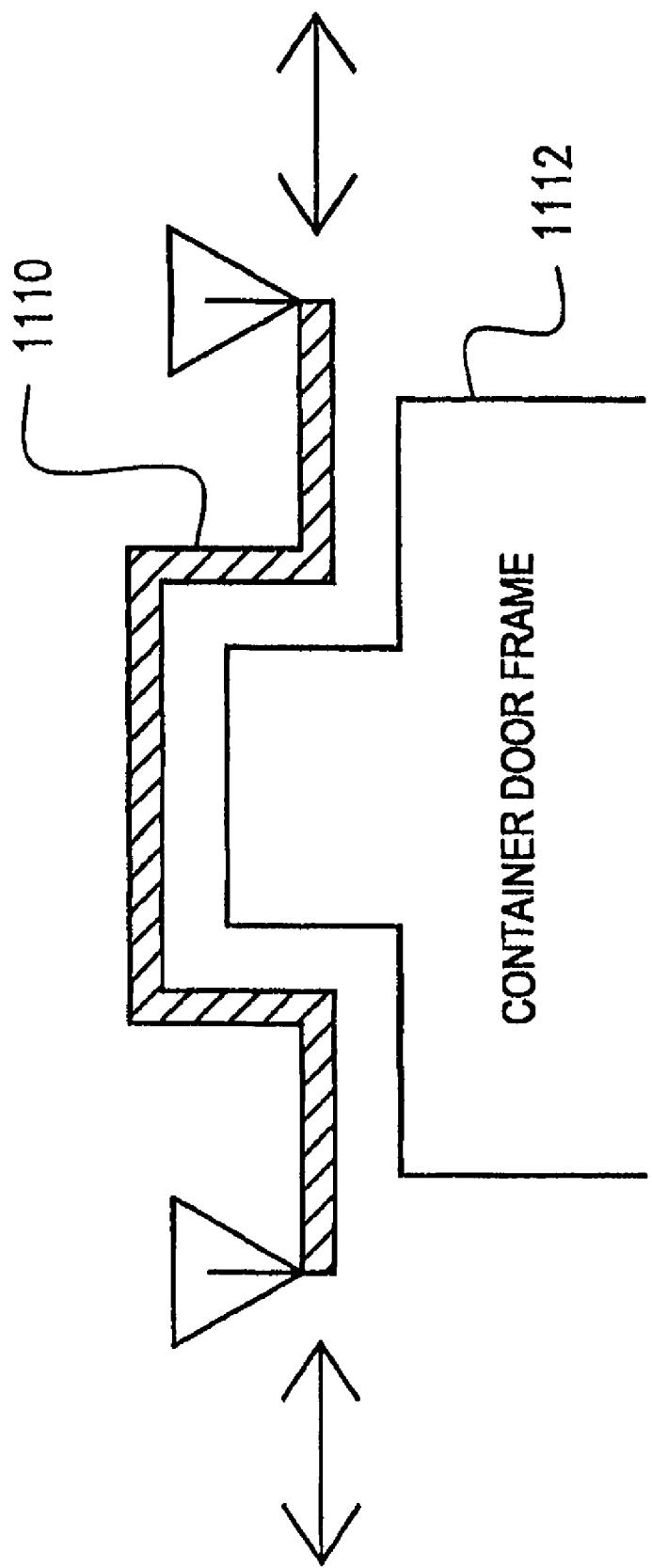
FIG. 11 shows a functional example of the pass-through antenna according to an embodiment of the invention.

With reference now to FIGS. 9-11, examples of pass-through antennas for use in accordance with the present invention will now be discussed. An important link in the communications chain of the present invention is the communication of messages and alarm from within the container to remote monitoring stations via a wireless link. According to a preferred embodiment of the present invention, such a wireless link is preferably established via a pass-through antenna 902 which receives signals from within the container and guides those signals outside of the container. An example pass-through antenna 902 is shown in FIG. 9, which includes: an external antenna element 904, a substantially planar signal conduit element 906; and a internal antenna element 908.

As shown in FIG. 11, this pass-through antenna 1110 according to the present invention is preferably designed to fit snugly within the door frame 1112 of a container, and to guide RF signals into and out of the container. As shown in FIG. 9, the pass-through antenna of the present invention can also be configured to receive signals and send signals input via wired connection 910 as well. FIG. 10 illustrates an example configuration and use of the pass-through antenna of the present invention. As shown, the pass through antenna 1002 is mounted onto the doorframe 1012 of a container. Accordingly, external antenna element 1010 has unobstructed access to transmit and receive signals from outside the container. Further, the substantially planar signal conduit element 1008 provides a conduit across the threshold of the container. Further, internal antenna element 1004 is available to transmit and receive signals within the container. As illustrated, a WLAN link 1006 or other devices may be attached via a serial port to the internal antenna element.

3. RFID Reader

As further shown in FIG. 5, one of the preferred wired connections into the communication manager 502 is an RFID Reader system. In accordance to a further preferred embodiment of the present invention, an RFID reading device in accordance with the Class 1, Version 2 (Gen 2) RFID specification.

The RFID Reader system is included in and designed to read RFID equipped pallets. Preferably, the RFID Reader data will be largely self sufficient with only alarm conditions (such as missing inventory) passed to the sensor controller for processing and storage in associated memory. However, one of the new sensor functions could be to use the RFID reader as a hole detector, measuring the energy of RF backscatter (as discussed above). In that scenario, the RFID reader, if it sensed a sudden loss of backscatter energy caused by the creation of a large hole in the container's metal shell, would be designed to immediately pass an alarm indication to the sensor manager, which would provide an appropriate data indicator for the alarm controller and communications manager modules.

In operation, the RFID reader forms the backbone of an electronic manifest system that verifies accurate loading of pallets (with associated RFID tags) and validates their ultimate disposition. In accordance with a preferred embodiment, at least one door sensor will interface with the power circuit of a tag reader capable of reading pallet and carton product tags through an RS-232 compatible serial interface. The logic of the RFID reader is in its controller, which is programmed to accept a list of unique serial numbers from a flash memory card or chip and seek their corresponding RFID tags as they are loaded or unloaded into and out of the container. The RFID reader must be able to read various commercial protocols and employs multiple tag collision avoidance algorithms. The readers typically use frequency hopping in a band centered around 915 MHz.

Preferably, the RFID Reader is located near the container door to minimize the distance between the reader and a RFID tag entering or leaving the container, thus enhancing the sensing and reading of the RFID tag. The size and location of the auxiliary power unit will be determined during system development. The auxiliary power unit will supply the RFID reader through a power bus that could be tapped for one or more of the sensor clusters.

4. Physical Deployment

Figure 6:
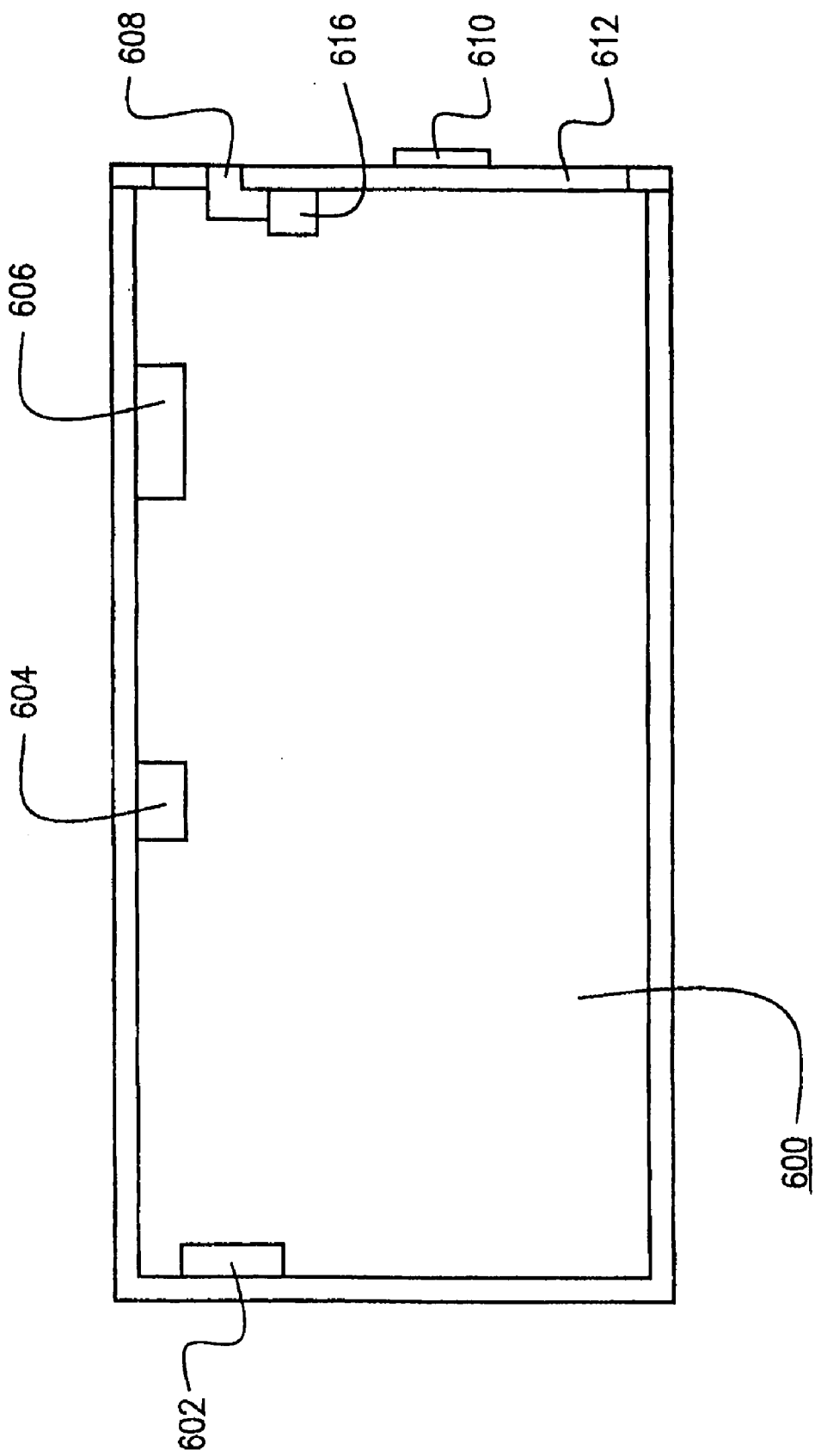
FIG. 6 shows a side view of an example of a monitoring system deployed to an embodiment of the invention.

With reference now to FIG. 6, an exemplary illustration of a container 600 monitored by the present invention will now be discussed. As shown in FIG. 6, monitoring device 602, incorporating the sensors, communication, and control elements of the present invention, is positioned within the container. Alternatively, the sensors and other elements of the monitoring devices may be positioned at alternate locations such as 604 or 606, as dictated by environmental concerns. Further, the sensors may be co-located as a single sensor suite (as shown) or broken-up and deployed throughout the container separately.

As further shown in FIG. 6, a pass-through antenna 608 is located on the door frame 612 and attached to a wireless interface device 616. Further shown, a satellite transceiver element 610 is mounted on the front surface of the container door 612. Accordingly, the monitoring device 602 of the present invention is able to process signals received from its sensor system and relay necessary information via wireless link 616 and pass-through antenna 608 to the satellite transceiver element 710. The monitoring device is preferably able to receive information and request for information via the same path for duplex communications and trigger a preset alarm communications over the satellite communicator for simplex satellite communications devices.

Figure 7:
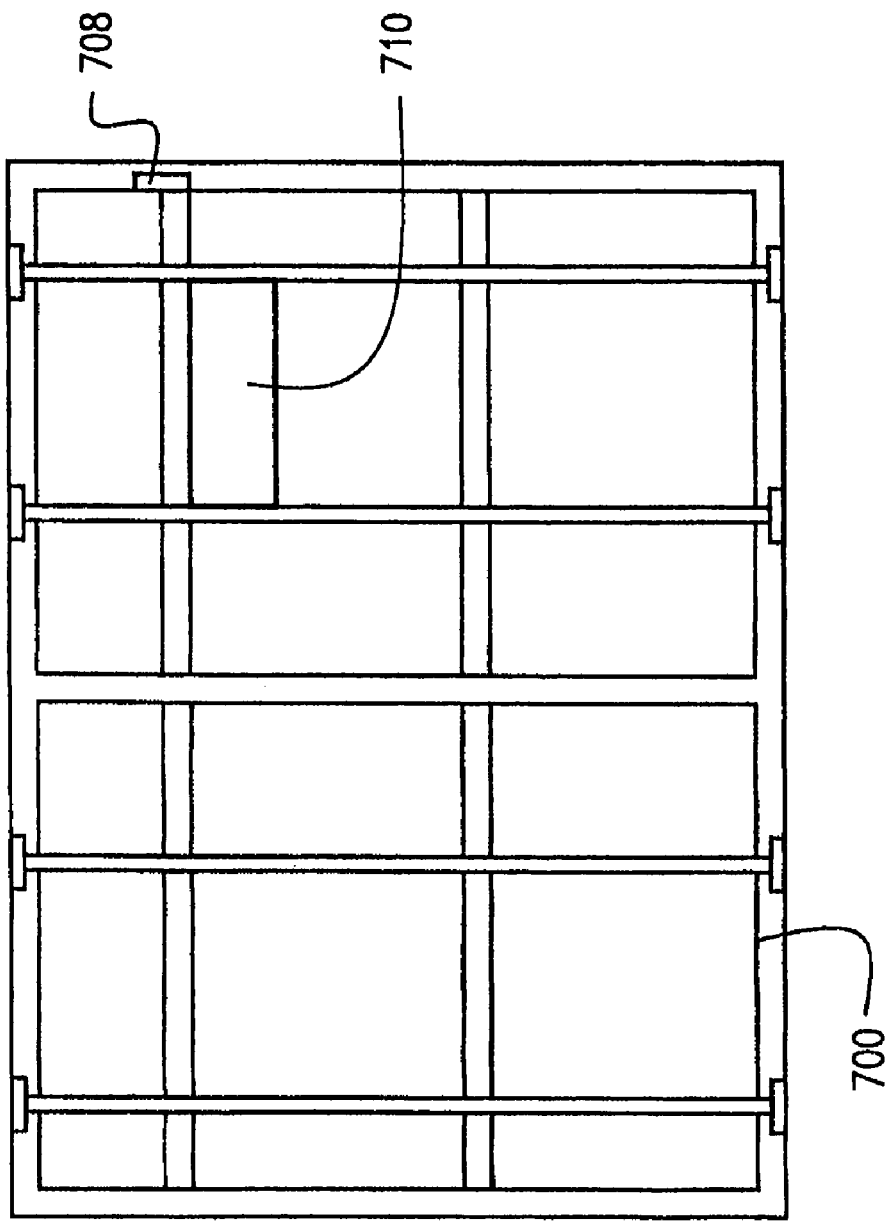
FIG. 7 shows a front view of an example of a monitoring system deployed to an embodiment of the invention.

With reference now to FIG. 7, an front view of the container 700 in FIG. 6 is provided to illustrate the location of the pass-through antenna 708 and the satellite transceiver element 710.

Figure 8:
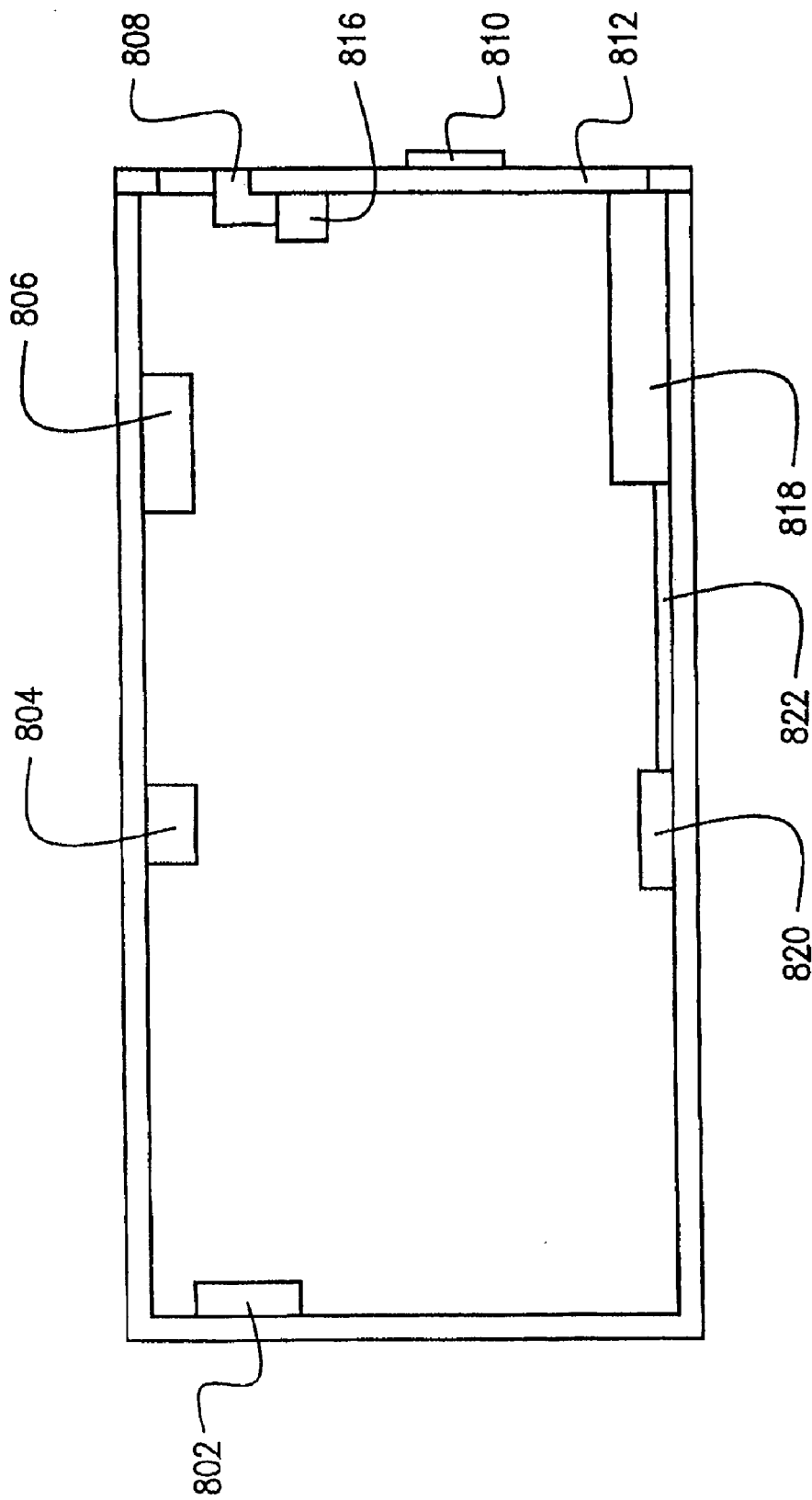
FIG. 8 shows a side view of an example of a monitoring system deployed to an alternative embodiment of the invention.

With reference now to FIG. 8, a similar configuration to that of FIG. 6 is provided with the addition of an RFID reader 818 with a power supply 820 and power bus 822. Accordingly, as shown in FIG. 8, a monitoring device 802 is shown along with alternate locations 804 and 806. Further shown, a pass-through antenna 808 is located on the door frame 812 and attached to a wireless interface device 816. Further shown, a satellite transceiver element 810 is mounted on the front surface of the container door 812. Accordingly, the monitoring device 802 of the present invention is able to process signals received from its sensor system and relay necessary information via wireless link 816 and pass-through antenna 808 to the satellite transceiver element 810. Further, the RFID Reader 818 is preferably positioned to record the comings and goings of RFID tagged items, which is able to transmit to either the monitoring device or directly to the wireless link 816.

5. Dataflow

Figure 12:
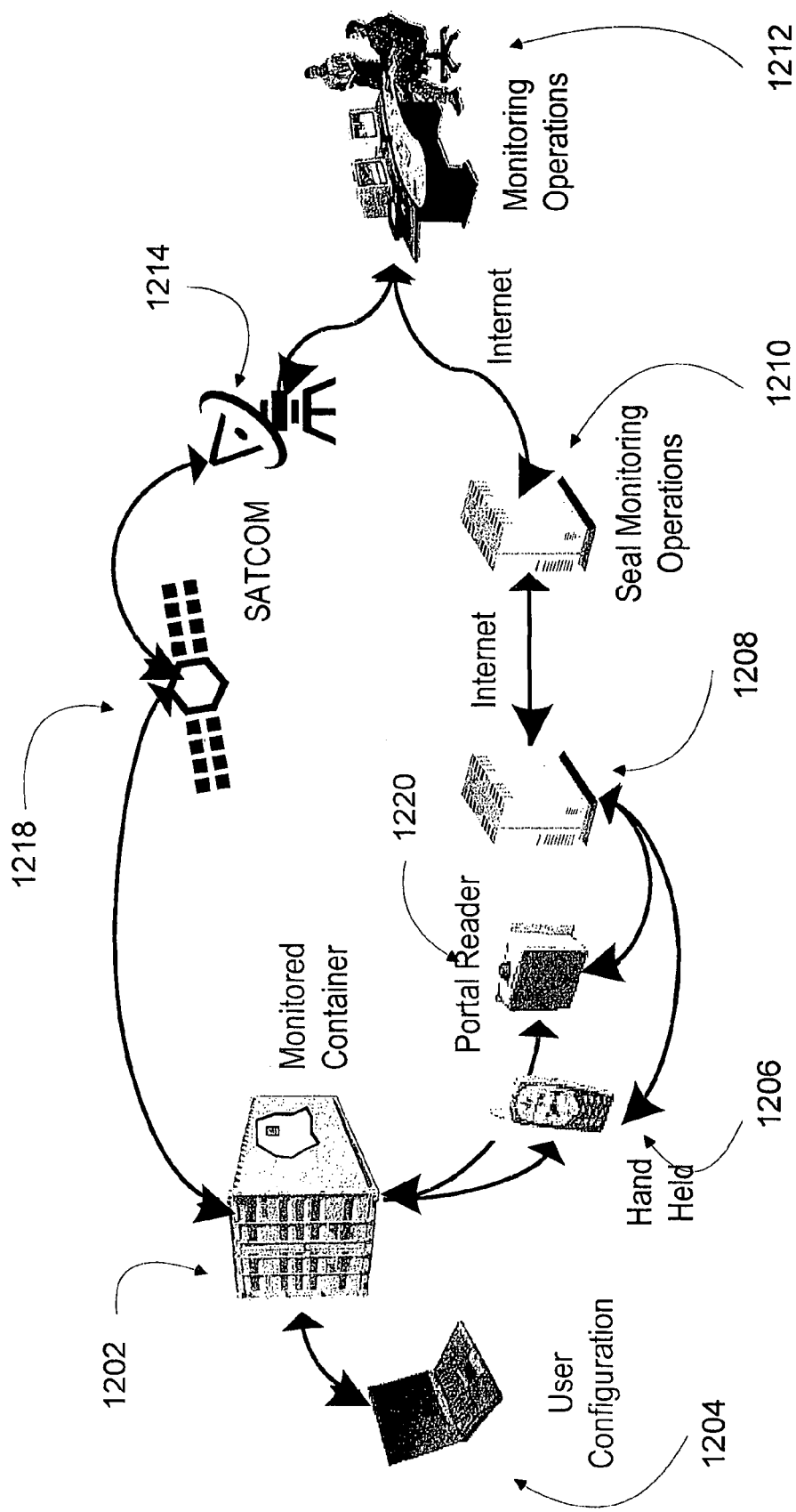
FIG. 12 system diagram of a monitoring system incorporating an embodiment of the invention.

With reference now to FIG. 12, the flow and transfer of data within the present invention will now be discussed. As discussed above, environmental and content data is initially generated from within the monitored container 1202 via a suite of sensors. These sensors may include information from an RF e-seal device and an RFID reader device. As shown in FIG. 12, the configuration of the sensors and controllers within the container 1202 may be configured via a laptop interface 1204 or similar device. Through this configuration step, a user of the present invention may set alarm threshold levels, select communication protocols, turn on and off selected sensors as desired, download stored data, check battery and power levels and other set-up functions.

Once in a monitoring status, the security system of the present invention then functions to monitor and report the status of the container to a central monitoring station 1212 (as discussed below). As illustrated in FIG. 12, information from the container may be transmitted using a variety of paths. According to a first preferred embodiment of the present invention, data from the container may, for instance, be transmitted from the satellite communication device to an orbiting satellite 1218 which may then transmit the information to a satellite transceiver element 14, which may then route the information to the central monitoring station 1212. As shown, information may also be transmitted from the central monitoring station 1212 to the monitored container 1202 via the same path.

As further shown in FIG. 12, an alternative pathway for data may also be used without directly using satellite communications. According to this second pathway, data from the monitored container 1202 may be provided via wireless signal to a hand-held device 1206 (such as a personal digital assistance, cellular phone or similar device) or to a specially designed portal reading device 1220 for receiving data. Both sets of devices may alternatively receive data via a direct serial connection to the monitored container 1202 when circumstanced allow. In either circumstance, data transmission may be initiated by either the monitoring system or by the data reading device.

As further shown, such data transmissions received by either type device may then be transferred via the Internet 1208 to the central monitoring station 1212. Where available, data may be routed to dedicated monitoring services (i.e. a seal monitoring operation 1210) as well as to the central monitoring station. Such monitoring services may receive data from only specific sensors for data. For instance, data from an RF e-Seal type device or RFID reader may be transmitted directly to a specific monitoring service 1210 concerned only with alerts and reports from that particular sensor.

6. Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-Mail, HTML and flat text files. After receiving such data, the data fusion center preferably would act to process the information to identify anomalies. With this data collected and processed, analyst may calculate statistics and probability of detection models used for decision support.

In terms of decision making, such a data fusion center would assist agents and shippers in making decisions regarding the safety and status of each container. In short, such a data fusion center would preferably provide a consolidated source of information that could be used to assist agencies and shippers to identify and remove unsafe and suspicious containers from commerce.

What is claimed is:

1. A system for monitoring the condition of contents or breach of a closed container, the system comprising:
   a sensing system, comprised of one or more sensors,
   a control element for analyzing received sensor data from the sensing system; and
   a communication system for receiving signals from at least one sensor and for forwarding the received signals to a remote location; wherein one or more sensors include at least one sensor from the group of sensors containing: temperature sensor, visible light sensor, acoustic sensor; vibration sensor; motion sensor, microbolometer, smoke detector and a door switch sensor;
   and further wherein one or more signals are transmitted from within the container to outside the container via a pass-through antenna comprising: an internal antenna element configured to receive signals from within the container; a substantially planar signal conduit element; and an external antenna element configured to accept signals from the planar signal element and to allow those signals to transmit outside the container.

2. The system of claim 1, wherein the planar signal element is configured to reside within the door frame of the container.

3. The system of claim 1, wherein the system further comprises a reading device for reading data marked or stored on the contents of the container.

4. A method for monitoring the status of a container, wherein the container includes sensors and a controller, the method comprising:
   receiving data from at least one sensor;
   performing operations within a controller, wherein the operations comprise: comparing the received sensor data to stored predetermined conditions, initiating a message signal in response to the received sensor data, and transmitting the initiated message signal from the container;
wherein the signals are transmitted from within the container to outside the container via a pass-through antenna, further wherein the pass-through antenna comprises: an internal antenna element configured to receive signals from within the container; a substantially planar signal conduit element; and an external antenna element configured to accept signals from the planar signal element and to allow those signals to transmit outside the container.

5. The method of claim 4, wherein the method further comprises reading data marked or stored on the contents of the container.

6. The method of claim 5, wherein the external antenna element is configured as an end portion of the planar signal conduit element.

7. The method of claim 6, wherein the planer signal conduit element is configured to reside within the door frame of the container.

8. The method of claim 4, wherein the door switch sensor comprises an RF e-Seal device.

9. The method of claim 4, wherein the sensing system includes at least one sensor for measuring the integrity of the container.

10. The method of claim 9, wherein the integrity of the container is determined at least in part by a measurement of ultrasonic waves.

11. The method of claim 9, wherein the integrity of the container is determined at least in part by a measurement of reflected RF energy.

12. The system of method 9, wherein the integrity of the container is determined at least in part by a measurement of container conductivity.

* * * * *